US011867410B2

(12) United States Patent
Song

(10) Patent No.: US 11,867,410 B2
(45) Date of Patent: Jan. 9, 2024

(54) ELECTRIC HEATER AND COOKING APPLIANCE HAVING SAME

(71) Applicant: LG ELECTRONICS INC., Seoul (KR)

(72) Inventor: Misun Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1087 days.

(21) Appl. No.: 16/547,087

(22) Filed: Aug. 21, 2019

(65) Prior Publication Data

US 2020/0063976 A1 Feb. 27, 2020

(30) Foreign Application Priority Data

Aug. 21, 2018 (KR) ........................ 10-2018-0097571

(51) Int. Cl.

| | |
|---|---|
| ***A23L 3/00*** | (2006.01) |
| ***F24C 7/08*** | (2006.01) |
| ***F24C 7/06*** | (2006.01) |
| ***H05B 3/03*** | (2006.01) |

(52) U.S. Cl.

CPC .............. *F24C 7/083* (2013.01); *F24C 7/067* (2013.01); *H05B 3/03* (2013.01); *H05B 2203/002* (2013.01); *H05B 2203/014* (2013.01); *H05B 2203/037* (2013.01)

(58) Field of Classification Search

CPC .... H05B 3/748; H05B 3/03; H05B 2203/013; H05B 2203/014; H05B 2203/002; H05B 2203/037; F24C 7/083; F24C 7/067

USPC .......................................................... 219/478

See application file for complete search history.

(56) References Cited

U.S. PATENT DOCUMENTS 2,330,867 A * 10/1943 Challet ................. F24C 15/106 219/458.1
3,067,315 A * 12/1962 Hurko ...................... H05B 3/26 219/466.1
3,173,467 A * 3/1965 Damon ..................... F23N 1/02 431/31
3,228,614 A * 1/1966 Bauer ................... F23D 14/151 239/432

(Continued)

FOREIGN PATENT DOCUMENTS

EP 228808 7/1987
EP 3211965 A1 8/2017

(Continued)

*Primary Examiner* — Eric S Stapleton
(74) *Attorney, Agent, or Firm* — Bryan Cave Leighton Paisner LLP

(57) ABSTRACT

An electric heater includes a substrate; a first plane heating element disposed on a surface of the substrate; and a second plane heating element disposed on the surface of the substrate so as to be located outside the first plane heating element. The first plane heating element includes a first pattern portion having a start point and an end point, and a pair of first electrode portions connected to the first pattern portion. The second plane heating element includes a second pattern portion that surrounds a portion of an outer circumference of the first pattern portion, has a start point and an end point, and has an opening portion at one side thereof; and a pair of second electrode portions connected to the second pattern portion.

20 Claims, 10 Drawing Sheets

(56) References Cited

U.S. PATENT DOCUMENTS 3,233,653 A * 2/1966 Nakamura ................ F24C 1/10 126/92 R
3,459,921 A * 8/1969 Fussell .................. F24C 15/021 219/398
3,565,684 A * 2/1971 Buck ....................... C23C 30/00 428/432
3,730,911 A * 5/1973 Aubin et al. .......... C04B 35/505 252/521.3
3,849,181 A * 11/1974 Green ..................... C04B 35/10 427/255.18
4,002,883 A * 1/1977 Hurko .................... H05B 3/748 219/466.1
4,032,750 A * 6/1977 Hurko .................... H05B 3/748 219/466.1
4,073,970 A * 2/1978 Allen ..................... H05B 3/748 427/282
4,394,564 A * 7/1983 Dills ........................ H05B 3/68 219/465.1
4,527,050 A * 7/1985 Kicherer ................ H05B 3/748 338/217
4,539,059 A * 9/1985 Burger .................. B29C 66/433 219/121.72
4,549,866 A * 10/1985 Granville ................. C21D 9/50 432/12
4,744,381 A * 5/1988 Pritchett ................. E04H 15/26 135/93
4,973,826 A * 11/1990 Baudry .................. H05B 3/748 219/466.1
5,396,047 A * 3/1995 Schilling .................. H05B 3/68 219/486
5,635,093 A * 6/1997 Arena ...................... H05B 3/68 219/448.12
5,800,787 A * 9/1998 Kato ....................... F01N 3/281 219/205
5,979,428 A * 11/1999 Greene, Jr. ............. A47J 36/26 126/50
6,392,205 B1 * 5/2002 Minonishi ......... H01L 21/67248 219/443.1
6,423,400 B1 * 7/2002 Yushio .................. C04B 37/006 428/210
6,616,767 B2 * 9/2003 Zhao ................. H01L 21/67103 392/416
6,720,533 B2 * 4/2004 Keum ...................... H05B 3/28 219/448.11
6,875,960 B2 * 4/2005 Yamaguchi ....... H01L 21/67103 219/544
6,921,882 B2 * 7/2005 Gadow .................. H05B 3/748 219/465.1
7,832,780 B1 * 11/2010 Ramseyer ............... F24C 15/30 296/22
8,841,588 B2 * 9/2014 Liu ........................ H05B 3/145 219/520
9,151,495 B1 * 10/2015 Archer ....................... F23J 7/00
9,568,192 B1 * 2/2017 Archer ..................... F23J 15/02
11,253,100 B2 * 2/2022 Song ........................ H05B 3/26
11,397,007 B2 * 7/2022 Song ........................ H05B 3/74
11,406,222 B2 * 8/2022 Song ........................ H05B 3/03
11,415,324 B2 * 8/2022 Song ....................... F24C 7/083
2002/0158060 A1 * 10/2002 Uchiyama .............. H05B 3/265 219/444.1
2003/0015517 A1 * 1/2003 Fure ....................... H05B 3/265 219/465.1
2004/0074893 A1 * 4/2004 Wermbter ............. H05B 3/746 219/465.1
2006/0102613 A1 * 5/2006 Kuibira .................... H05B 3/12 219/444.1
2007/0009784 A1 * 1/2007 Pal ...................... H01M 4/9066 429/432
2008/0107948 A1 * 5/2008 Yamanis ............. H01M 8/0247 429/510
2009/0272728 A1 * 11/2009 Abbott ................. H05B 1/0263 219/399
2009/0325782 A1 * 12/2009 Venkataramani ... C23C 18/1216 219/396
2010/0098996 A1 * 4/2010 Hwang ............... H01M 4/8803 977/773
2010/0170884 A1 * 7/2010 Iwata ................ H01L 21/67109 219/444.1
2010/0193502 A1 * 8/2010 Kim ....................... H05B 3/748 219/520
2014/0023957 A1 * 1/2014 Brandner ................ C04B 35/01 429/509
2014/0169845 A1 * 6/2014 Nakahara ................. H05B 3/26 399/338
2014/0170529 A1 * 6/2014 Jain ..................... H01M 8/0236 252/518.1
2014/0261394 A1 * 9/2014 Evans ....................... F24C 3/14 126/9 B
2015/0201805 A1 * 7/2015 Cedar ................. A47J 37/0786 320/101
2017/0245323 A1 * 8/2017 Lee .......................... H05B 3/26
2019/0093023 A1 * 3/2019 Cook ..................... C10G 33/00
2020/0060468 A1 * 2/2020 Song ................... A47J 36/2483
2020/0063976 A1 * 2/2020 Song ........................ H05B 3/03
2020/0063977 A1 * 2/2020 Song ...................... H05B 3/748
2020/0068664 A1 * 2/2020 Song ........................ H05B 3/76

FOREIGN PATENT DOCUMENTS

JP 2014053574 A 3/2014
KR 1020090009600 A 1/2009
KR 200465232 Y1 2/2013
KR 101762159 7/2017
KR 2020170002715 U 7/2017
WO 2002071806 A1 9/2002
WO 2009014333 A1 1/2009

* cited by examiner

ELECTRIC HEATER AND COOKING APPLIANCE HAVING SAME

CROSS-REFERENCE TO RELATED APPLICATIONS

This application claims priority to Korean Patent Application No. 10-20018-0097571, filed on Aug. 21, 2018, which is hereby incorporated by reference in its entirety.

FIELD OF THE DISCLOSURE

The present disclosure relates to an electric heater applied to a cooking appliance, and to an electric heater including a plurality of plane heating elements capable of heating at a high temperature within a limited area.

BACKGROUND

In general, a cooking appliance refers to a device for heating and cooking food using gas or electricity. Various devices such as a microwave oven using microwaves, an oven using a heater, a gas stove using gas, an electric stove using electricity, or a cooktop including a gas stove or an electric stove have come into widespread use for heating and cooking.

The gas stove directly generates flame using gas as a heating source, while the electric stove heats a container and food placed on a top plate thereof using electricity.

In the gas stove, heat loss of the flame may be large and contaminants may be discharged due to incomplete combustion, thereby polluting indoor air. Therefore, recently, electric stoves are attracting attention.

Electric stoves may be classified into an inductive electric stove which directly heats a container in which a magnetic field is generated by a magnetic induction method, and a resistive electric stove which heats a top surface made of, for example, ceramic using a hot wire.

The inductive electric stove has a short cooking time at a high temperature and uses a dedicated magnetic container. The resistive electric stove may use an existing container, but has a relatively long cooking time.

Even if an existing resistive electric stove uses a heating element made of a nichrome wire, an electric heater using a plane heating element is being developed in order to reduce the thickness of the heating element.

In addition, in order to shorten the cooking time, a resistive electric stove using an electric heater capable of heating a limited area at a high temperature is being developed.

As an example of such an electric heater, Korean Patent Registration No. 10-1762159 B1 (published on Aug. 4, 2017) discloses a plane heating element including a substrate having a surface made of an electrically insulating material, a heating element attached to the surface of the substrate and having a predetermined shape, and a power supply for supplying electricity to the heating element.

In the electric heater, the temperature distribution of an object to be heated may be changed according to the shape (that is, the pattern) of the plane heating element, and the plane heating element may be formed in a shape capable of heating the object to be heated as uniformly as possible.

The plane heating element of the electric heater includes a plurality of tracks having a straight-line shape or an arc shape and adjacent tracks of the plurality of tracks may be connected through a bridge (or a track).

As another example of the heater, European Patent Publication No. EP 0,228,808 A2 (published on Jul. 15, 1987) discloses a temperature sensitive device. Such a device is configured by printing a heater track made of a conductive material and a plurality of electrodes on a ceramic coating layer. As current is supplied through the electrodes, radiant heat is generated in the heater track.

However, the existing plane heating element includes a heating unit in which a single hot wire is formed within a limited area in a predetermined pattern shape, and the heating unit is designed to have a high resistance in order to generate heat at a high temperature of 500° C. or higher.

Also, the power required for each size of the cooking appliance is different, and configuring the heating unit with only one hot wire in order to generate heat up to a high temperature step by step according to the user's need may be difficult.

SUMMARY

One Aspect is to provide an electric heater including a plane heating element capable of heating a limited area to a high temperature step by step.

Another aspect is to provide an electric heater capable of having a plurality of plane heating elements in consideration of a limited area.

Another aspect is to provide an electric heater capable of preventing dielectric breakdown of each plane heating element even if a plurality of plane heating elements are formed within a limited area.

In view of the above, an electric heater includes a substrate; a first plane heating element disposed on one surface of the substrate; and a second plane heating element disposed on the one surface of the substrate so as to be located outside of the first plane heating element, in which the first plane heating element includes: a first pattern portion having a start point and an end point, and a pair of first electrode portions connected to the first pattern portion, and in which the second plane heating element includes: a second pattern portion that surrounds a portion of an outer circumference of the first pattern portion, having a start point and an end point, and having an opening portion at one side thereof; and a pair of second electrode portions connected to the second pattern portion. Therefore, a dual-pattern heating unit may be formed on the substrate to provide, for example, a two-step heating intensity.

As an example, the first pattern portion may be disposed on a first zone Z1 having a radius R1 of 99 mm or more, and the second pattern portion may be disposed on a second zone Z2 having a radius R2 of 152 mm or more outside the first zone. Therefore, the heating portion of the dual pattern may be configured to match the size of the cooking appliance.

In addition, the start point and the end point of the first pattern portion may be located at an outermost side of the first zone, and the start point and the end point of the second pattern portion may be located at an innermost side of the second zone. Therefore, the potential difference between the first and second pattern portions may be reduced.

In addition, the second electrode portions may be located outside the first electrode portions in the same direction. Therefore, one power supply may supply current to the heating unit of the dual pattern.

In addition, the electric heater may further include a third plane heating element disposed on the one surface of the substrate so as to be located outside the second plane heating element, the third surface heating element further includes a third pattern portion that surrounds a portion of an outer circumference of the second pattern portion, has a start point and an end point, and has an opening portion in the same direction as the opening portion of the second pattern portion, and a pair of third electrode portions located outside the third pattern portion and connected to the third pattern portion. Therefore, the heating unit of the triple pattern may be configured to provide three-step heating intensity.

For example, the third pattern portion may be formed in a third zone Z3 having a radius R3 of 225 mm or more outside the second zone. Therefore, the heating unit of the triple pattern may be configured to match the size of the cooking appliance.

In addition, the start point and the end point of the third pattern portion may be located at the outermost side of the third zone or may be located at the innermost side of the third zone. Therefore, the start point and the end point of the third pattern portion may be positioned adjacent to the start point and the end point of the second pattern portion, and the potential difference between the second and third pattern portions may be reduced.

In addition, the third electrode portions may be located outside the second electrode portions in the same direction or may be located in a different direction including opposite direction to the second electrode portions. Therefore, one power supply or two power supplies may supply current to the three pattern portions.

In addition, at least one pattern portion of the first, second, and the third pattern portion includes a plurality of tracks having an arc shape, which are spaced apart from each other and increase from the inside to the outside in the respective zone, and a plurality of bridges connecting the tracks in series, and in which at least one pattern portion of the first, second, and the third pattern portion may be symmetrical about a reference line passing through a center of the first zone. Therefore, the heating unit of the multi-pattern may heat the limited area in a vertically, and laterally symmetrical manner.

A number N1 of tracks of the first pattern portion may be equal to or greater than a number N2 of tracks of the second pattern portion, and a number N2 of tracks of the second pattern portion may be equal to or greater than a number N3 of the third pattern portion.

In addition, hot wire lengths L1, L2, and L3 of the respective pattern portions are proportional to the numbers N1, N2, and N3 of tracks of the respective plane heating elements and sizes of the zones Z1, Z2, and Z3 on which the respective tracks are formed.

In addition, hot wire widths W1, W2, and W3 of the respective pattern portions are proportional to the hot wire lengths L1, L2, and L3 of the respective pattern portions and are inversely proportional to hot wire thicknesses T1, T2, and T3 of the respective pattern portions.

For example, the hot wire width W1 of the first track may be 5 to 20 mm, the hot wire width W2 of the second track may be 5 to 13.5 mm, and the hot wire width W3 of the third track may be 8 to 12 mm.

In addition, gaps G1, G2, and G3 between the tracks of the respective pattern portions may be proportional to heating temperatures Temp1, Temp2, and Temp3 with respect to a position of each track or may be proportional to potential differences ΔV1, ΔV2, and ΔV3 with respect to a position of each track.

The electric heater constitutes a plurality of plane heating elements with respect to a limited area and selectively operates a plurality of plane heating elements, so that the limited area may be heated up to a high temperature step by step.

In addition, when dividing the limited area by the inner/outer area and designing each plane heating element with respect to each area, the length, width, and gap of each plane heating element are limited, so that a plurality of plane heating elements may be configured according to the sizes of various cooking appliances. In addition, when it is possible to control the heat according to the size of the cooking pot and when the cooking pot is small, energy consumption may be saved.

In addition, even if a plurality of plane heating elements are formed within a limited area, the start point and the end point of each pattern portion connected to each electrode are limited, or the gap between the tracks constituting each pattern portion may be adjusted to prevent insulation breakdown of each plane heating element.

DETAILED DESCRIPTION OF THE PREFERRED EMBODIMENTS

Hereinafter, the preferred embodiments will be described in detail with reference to the accompanying drawings. It should be understood, however, that the scope of the inventive concept of the preferred embodiments may be determined from the matters disclosed in the present disclosure, and the spirit of the present invention possessed by the preferred embodiments includes implementations such as addition, deletion, modification etc., of components to the preferred embodiments.

Figure 1:
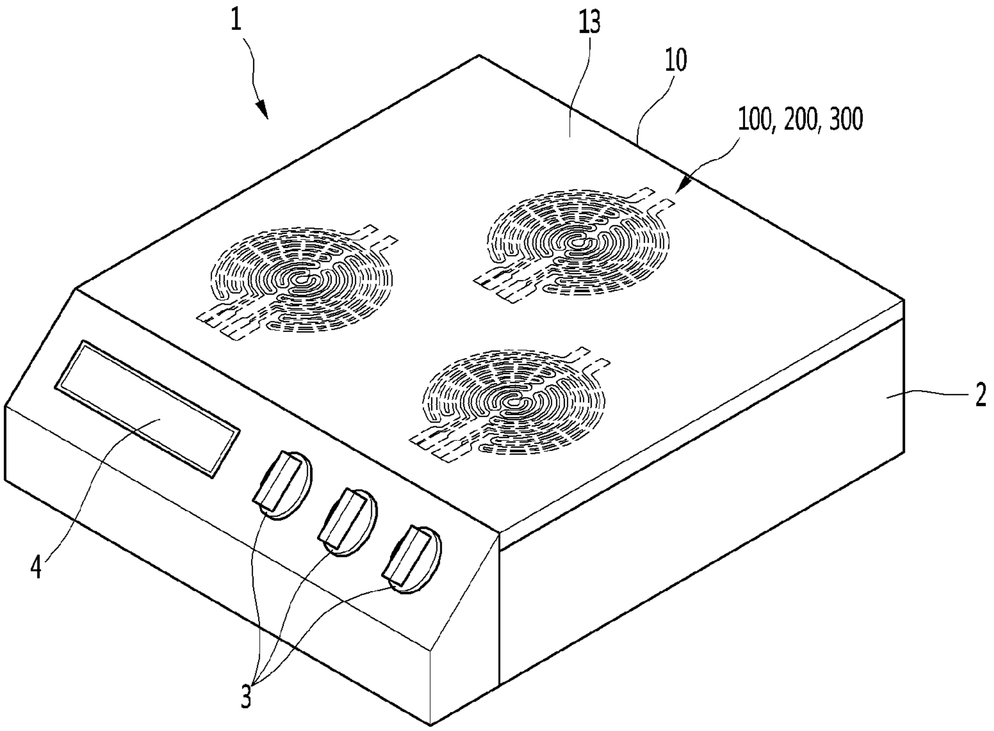
FIG. 1 is a perspective view illustrating an electric stove to which an electric heater according to an embodiment of the present invention is applied.
Figure 2:
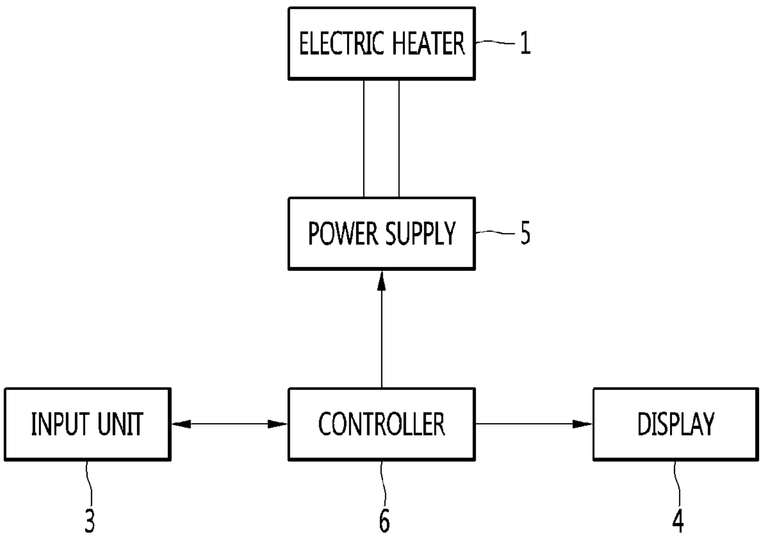
FIG. 2 is a control block diagram of an electric stove to which an electric heater according to an embodiment of the present invention is applied.

FIG. 1 is a perspective view illustrating an electric stove, to which an electric heater according to an embodiment of the present invention is applied, and FIG. 2 is a control block diagram of an electric stove, to which an electric heater according to an embodiment of the present invention is applied.

The electric stove may include a case 2 forming an outer appearance. The electric heater 1 of the present embodiment may configure a portion of the electric stove as a cooktop.

The electric heater 1 may be provided on the case 2. An upper surface of the case 2 may be opened and the electric heater 1 may be provided on the upper surface of the case 2.

The electric stove may include an input unit 3 for manipulating the electric stove and a display 4 for displaying a variety of information such as information on the electric stove. In addition, the electric stove may further include a power supply 5 connected to the electric heater 1 to apply current to the electric heater 1. Based on the configuration of the electric heater 1, the power supply may comprise of a plurality of power supplies. The electric stove may further include a controller 6 for controlling the power supply 5 and the display 4 according to input at the input unit 3. An example of the controller 6 may be a microprocessor, a digital signal processor, an electronic logic circuit, and the like. The controller 6 may control a plurality of plane heating elements 100, 200, and 300 together or individually.

The electric heater 1 may be provided on the case 2 such that the upper surface thereof is exposed to the outside. An object to be heated by the electric stove may be placed on the upper surface of the electric heater 1, and the upper surface of the electric heater 1 may be a surface on which the object to be heated is seated.

Figure 3:
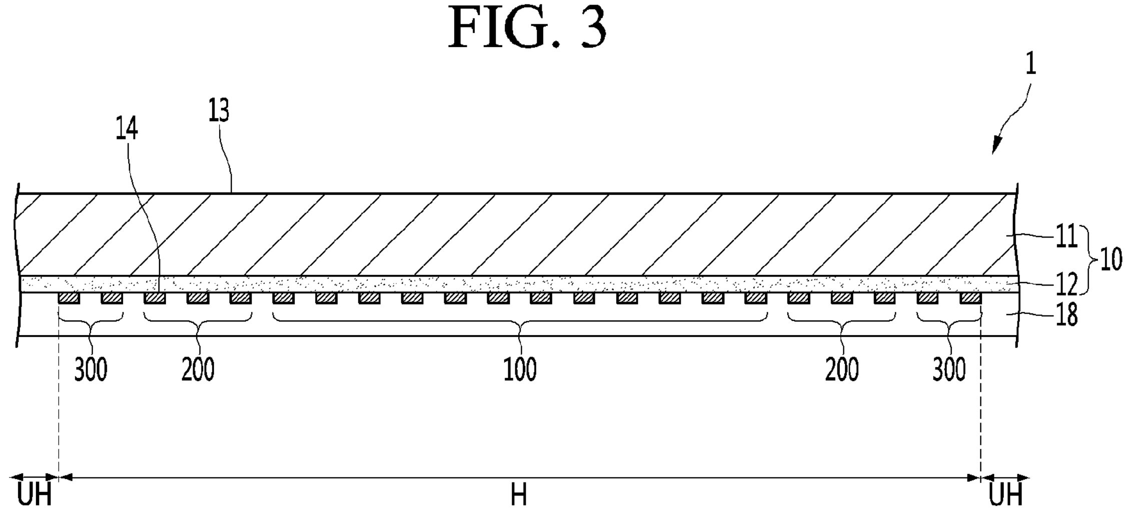
FIG. 3 is a cross-sectional view illustrating an electric heater according to an embodiment of the present invention.

FIG. 3 is a cross-sectional view illustrating an electric heater according to an embodiment of the present invention.

The electric heater 1 may include a substrate 10 and a plurality of plane heating elements 100, 200, and 300 disposed on one surface of the substrate 10.

The substrate 10 may be an insulating substrate having a conductor pattern disposed on a surface thereof. The upper surface of the substrate 10 may be a surface 13 on which the object to be heated is seated. The lower surface of the substrate 10 may be a surface 14 on which the plane heating elements 100, 200, and 300 are disposed.

The substrate 10 may include only a base 11 formed of an insulating material or may include a base 11 formed of an insulating material or a non-insulating material and an insulating layer 12 disposed on one surface of the base 11. Other layers may be added to the base 11.

The base 11 may be made of glass and the insulating layer 12 may be disposed on the lower surface of the glass using a coating or a printing method, etc.

The plane heating elements 100, 200, and 300 may be directly disposed on one surface of the base 11 formed of an insulating material or may be disposed on the insulating layer 12.

The base 11 may be formed in a shape of a plate on which the object to be heated is placed or in a shape of a container in which the object to be heated is received.

The insulating layer 12 may be disposed on the lower surface of the base 11. The insulating layer 12 may be disposed on the entire lower surface of the base 11 or may be disposed on a portion of the lower surface of the base 11. The insulating layer 12 may be disposed only in a zone in which the plane heating elements 100, 200 and 300 will be disposed. The insulating layer 12 may configure the entire lower surface of the substrate 10 or a portion of the lower surface of the substrate 10.

The plane heating elements 100, 200, and 300 may be disposed on the lower surface 14 of the insulating layer 12. The plane heating elements 100, 200, and 300 may have a size smaller than the substrate 10 and the lower surface of the substrate 10 may have a heated zone H, in which the plane heating elements 100, 200 and 300 are disposed, and an unheated zone UH located around the heated zone H.

The heater 1 may further include a coating layer 18 surrounding the plane heating elements 100, 200, and 300. The coating layer 18 may be formed of an electrically insulating material to protect the plane heating elements 100, 200, and 300.

The substrate 10 of the present embodiment may be formed of a flexible material, such as a flexible insulating film. In this case, the electric heater 1 may be a flexible planar heater. Such a flexible planar heater may be attached to a member, on which the object to be heated is placed, to heat the object to be heated, like the upper plate of the electric stove.

Figure 4:
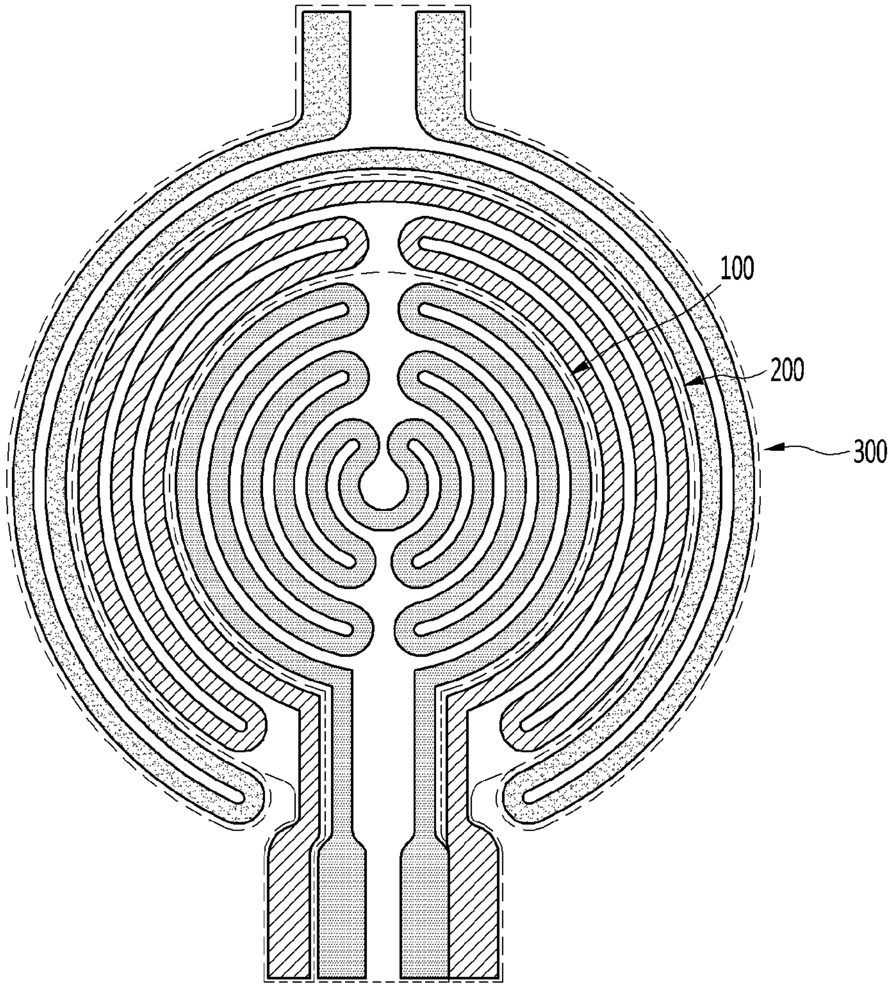
FIG. 4 is a plan view illustrating a triple-type plane heating element according to a first embodiment of the present invention.
Figure 5:
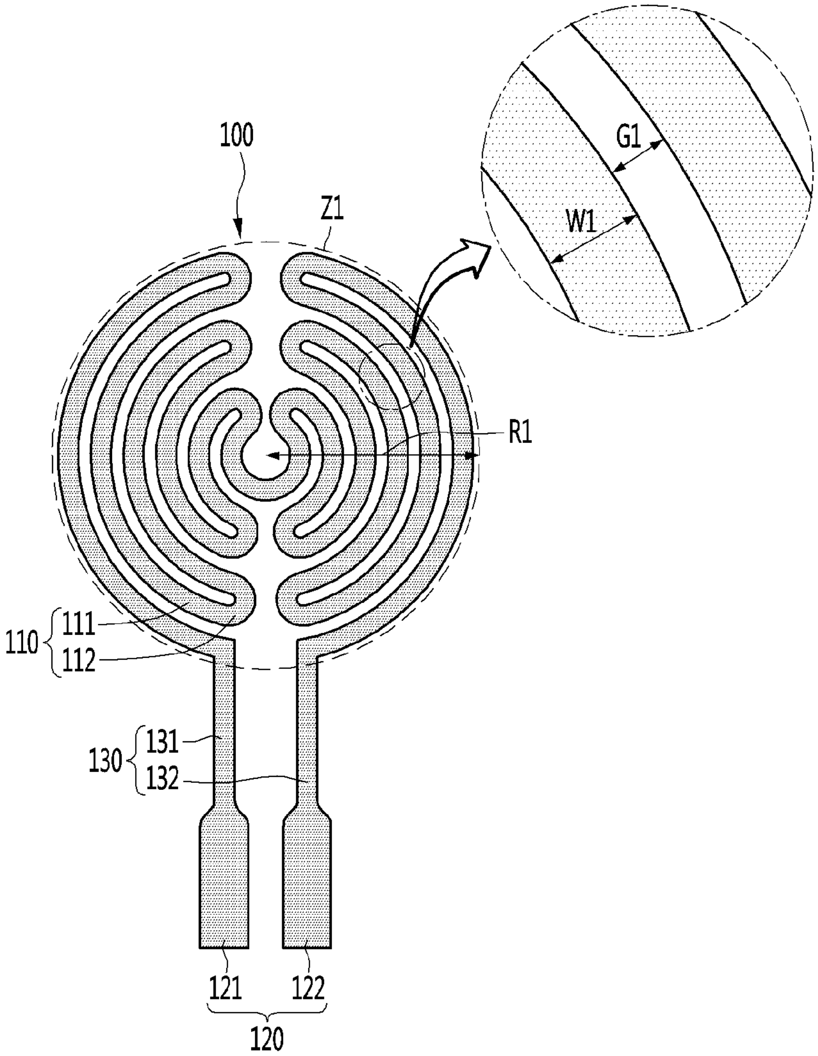
FIG. 5 is a plan view illustrating a first plane heating element of the triple-type plane heating element illustrated in FIG. 4.
Figure 6:
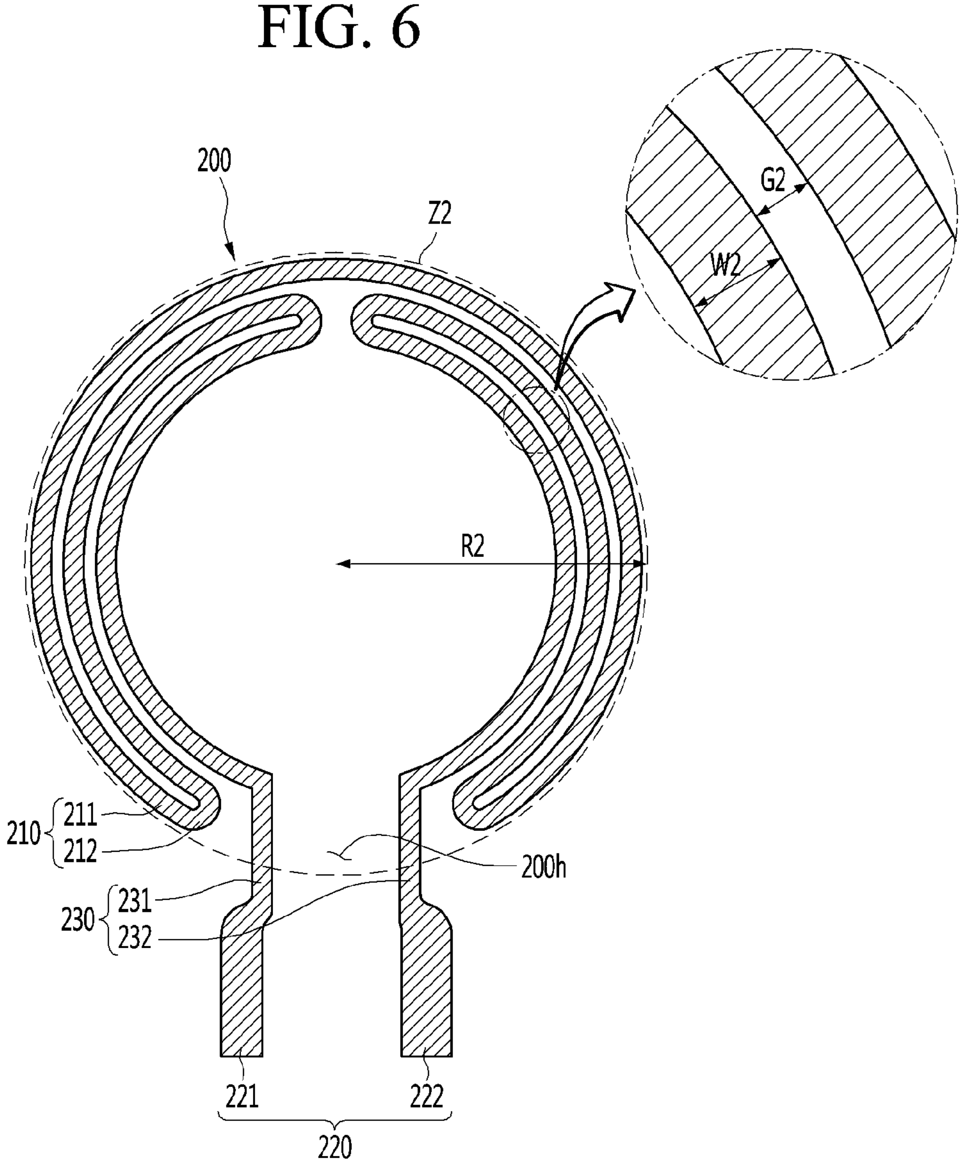
FIG. 6 is a plan view illustrating a second plane heating element of the triple-type plane heating element illustrated in FIG. 4.
Figure 7:
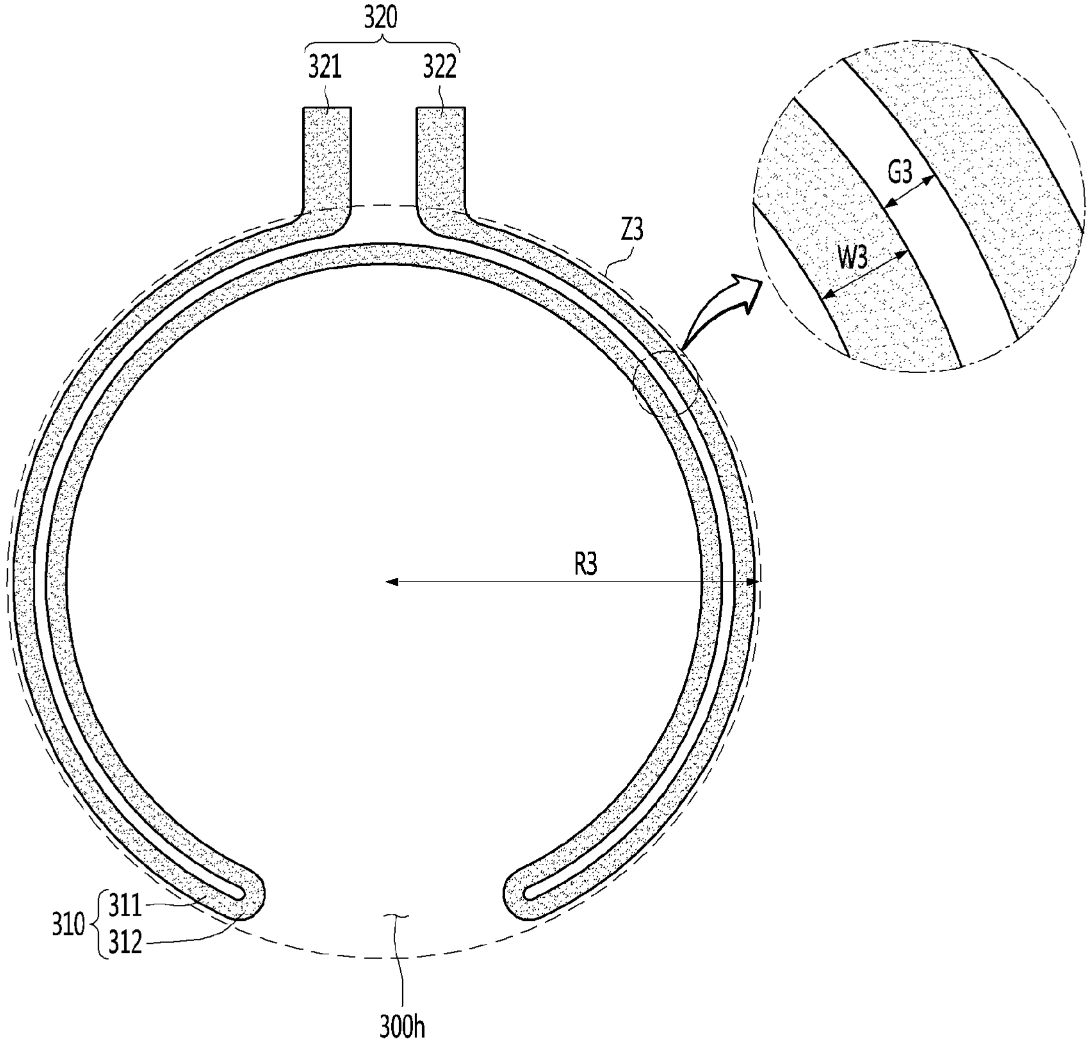
FIG. 7 is a plan view illustrating a third plane heating element of the triple-type plane heating element illustrated in FIG. 4.

FIG. 4 is a plan view illustrating a triple-type plane heating element according to a first embodiment of the present invention, and FIGS. 5 to 7 are plan views illustrating first, second, and third plane heating elements of the triple-type plane heating element illustrated in FIG. 4, respectively.

A triple-type plane heating element according to the first embodiment of the present invention has a first plane heating element 100, a second plane heating element 200, and a third plane heating element 300 on the same plane as illustrated in FIG. 4. The first plane heating element 100 is located at the center, the second plane heating element 200 is located to surround the first plane heating element 100, and the third plane heating element 300 is disposed so as to surround the second plane heating element 200.

As illustrated in FIG. 5, the first plane heating element 100 includes a first pattern portion 110 in which a hot wire is arranged in a predetermined shape in a first zone Z1, a first electrode portion 120 which supplies current to the first pattern portion 110, and a first connector 130 which connects between the first pattern portion 110 and the first electrode portions 120.

Even if the first pattern portion 110 and the first connector 130 are composed of a heating unit which generates heat when current is supplied thereto, the first electrode portion 120 may be configured with an unheated unit from which the amount of heat generated is significantly lower than that of the heating unit or which hardly generates heat even if current is supplied (i.e., has a significantly lower resistance than the first pattern portion 110 and the first connector 130).

The first zone Z1 is a limited area of a rounded shape such as a circle and an ellipse, and the radius R1 of the first zone may be limited to a range of 99 mm to 290 mm in this embodiment, and may be determined by the size, the required power, and the like of the cooking appliance.

The first pattern portion 110 includes a main heating unit in which hot wires are closely arranged in the first zone Z1, the first pattern portion 110 connects a start point and an end portion, which are located at the outermost side of the first zone Z1 according to various paths, and may be configured to have a symmetrical shape in the lateral direction with respect to the center of the first pattern portion 110 as illustrated in FIG. 5.

According to the embodiment, the first pattern portion 110 may include a plurality of first tracks 111 disposed from a center to the outermost side of the first zone Z1. The plurality of the first tracks 111 have an arc shape and a length of the first track 111 increases from the center to the outermost side of the first zone Z1 in the lateral direction. The plurality of tracks 111 are arranged diametrically with a predetermined gap, and a plurality of first bridges 112 connect the plurality of the first tracks 111 in series to each other.

The first electrode portion 120 includes a first positive electrode 121 to which current is inputted and a first negative electrode 122 from which the current is outputted, and the first positive electrode 121 and the first negative electrode 122 are horizontally located with a predetermined gap at an outside of a third zone Z3 to be described below.

At this time, the first electrode portion 120 has a significantly lower resistance than the first pattern portion 110 so as not to generate heat at a high temperature.

The first connector 130 is formed of a heating unit extending from a start point and an end point of the first pattern portion 110, and the first connector 130 includes a first input connector 131 connecting the start point of the first pattern portion 110 and the first positive electrode 121, and a first output connector 132 connecting the end point of the first pattern portion 110 and the first negative electrode 122.

At this time, the first connector 130 is configured to generate heat at a high temperature like the first pattern portion 110, and is located at a zone of second and third zones Z2 and Z3 as will be described below, on which the second and third pattern portions 210 and 310 are not formed, that is, an opening portion 200*h* of the second pattern portion and an opening portion 300*h* of the third pattern portion.

Therefore, the first connector 130 may uniformly generate heat in the entirety of the second and third zones Z2 and Z3 together with the second pattern portion 210 and the third pattern portion 310 without having a dead zone.

As illustrated in FIG. 6, the second plane heating element 200 includes the second pattern portion 210 in which a hot wire is arranged in a predetermined shape in the second zone Z2, a second electrode portion 220 which supplies current to the second pattern portion 210, and a second connector 230 which connects between the second pattern portion 210 and the second electrode portion 220.

Similarly, even if the second pattern portion 210 and the second connectors 230 are formed as a heating unit which generates heat as current is supplied, the second electrode portion 220 may be formed as an unheated unit from which the amount of heat generated is substantially lower than that of the heating unit or which hardly generates heat even if current is supplied.

The second zone Z2 is a limited area of a ring-shape located outside of the first zone Z1, the radius R2 of the second zone may be limited to a range of 152 mm to 290 mm in this embodiment and may be determined by the size, the required power, and the like of the cooking appliance.

The second pattern portion 210 is also formed of a main heating unit arranged closely to the second zone Z2, the second pattern portion 210 connects the start point and the end point, which are located at the innermost side of the second zone Z2 along various paths, and is configured in a symmetrical shape in the lateral direction.

In order to reduce a potential difference between the first and second pattern portions 110 and 210, it is preferable that the start point and the end point of the first pattern portion 110 are located at the outermost side of the first zone Z1, and the start point and the end point of the second pattern portion 210 are located at the innermost side of the second zone Z2 so as to be closest to the start point and the end point of the first pattern portion 110, respectively.

According to the embodiment, the second pattern portion 210 includes a plurality of second tracks 211 and a plurality of second bridges 212 in a symmetrical shape in the lateral direction like the first pattern portion 110.

In addition, at least a pair of second bridges 212 are located close to the start point and the end point of the first pattern portion 110, an opening portion 200*h* is formed between at least a pair of second bridges 212, and the opening portion 200*h* of the second pattern portion is a portion where the second pattern portion 210 of the second zone Z2 is not formed.

The second electrode portion 220 includes a second positive electrode 221 and a second negative electrode 222, and the second electrode portion 220 has a resistance which is significantly lower than that of the second pattern portion 210 so as not to generate heat at a high temperature.

At this time, the second electrode portion 220 is located in the same direction as the first electrode portion 120 and is connected by one power supply like the first electrode portion 120.

Of course, the second electrode portion 220 is located on both sides of the first electrode portion 120.

In order to reduce a potential difference between the first and second electrode portions 110 and 220, it is preferable that the first and second positive electrodes 121 and 221 are located adjacent to each other and the first and second negative electrodes 122 and 222 are located adjacent to each other.

The second connectors 230 are formed of a heating unit extending from a start point and an end point of the second pattern portion 210 and include a second input connector 231 connecting the start point of the second pattern portion 210 and the second positive electrode 221, and a second output connector 232 connecting the end point of the second pattern portion 210 and the second negative electrode 222.

Similarly, the second connector 230 is configured to generate heat at a high temperature like the second pattern portion 210, is located outside about the first connector 130, and is located at a zone of the third zone Z3 as will be described below, on which the third pattern portion 310 is not formed, that is, the opening portion 300*h* of the third pattern portion.

As illustrated in FIG. 7, the third plane heating element 300 includes a third pattern portion 310 arranged in a predetermined shape in a third zone Z3, and a third electrode portion 320 which supplies current to the third pattern portion. The third pattern portion 310 may include a heating unit which generates heat when current is supplied thereto, but the third electrode portion 320 may be an unheated unit which does not generate heat even when current is supplied.

The third zone Z3 may be a limited area of a ring-shape located outside the second zone Z2, the radius R3 of the third zone may be limited to a range of 225 mm to 300 mm in this embodiment, and may be determined by the size, the required power, and the like of the cooking appliance.

The third pattern portion 310 is also formed by heating units arranged closely in the third zone Z3, and connects between the start point and the end point, which are located at the outermost side of the third zone Z3 along various paths, and is configured in a symmetrical shape in the lateral direction. In another embodiment, the start point and the end point may be located at the innermost side of the third zone Z3.

When the start point and the end point of the second pattern portion 210 are located at the innermost side of the second zone Z2, it is difficult to locate the start point and the end point of the third pattern portion 310 close to the start point and the end point of the second pattern portion 210.

Therefore, in order to reduce a potential difference between the second and third pattern portions 210 and 310, it is preferable that the start point and the end point of the second pattern portion 210 are located at the innermost side of the second zone Z1, and the start point and the end point of the third pattern portion 310 are located at the outermost side of the third zone Z3.

According to the embodiment, the third pattern portion 310 may include a plurality of third tracks 311 and a plurality of third bridges 312 in a symmetrical shape in the lateral direction like the second pattern portion 210.

In addition, an opening portion 300*h* is formed between at least a pair of third bridges 312 and the opening portion 300*h* of the third pattern portion is a portion of the third zone Z3 on which the third pattern portion 310 is not formed.

The opening portion 300*h* of the third pattern portion is consecutively located outside the opening portion 200*h* of the second pattern portion, and the first and second connectors 130 and 230 are located over the opening portions 200*h* and 300*h* of the second and third pattern portions.

The third electrode portion 320 includes a third positive electrode 321 and a third negative electrode 322 and the third electrode portion 320 has a resistance much smaller than that of the third pattern portion 310 and is configured not to generate heat at a high temperature.

According to the embodiment, the third electrode portion 320 is disposed in an opposite direction to the first and second electrode portions 120 and 220 and is connected to a power supply different from the power supply connected to the first and second electrode portions 120 and 220.

The process of designing the triple pattern-type plane heating element according to the first embodiment configured as described above will now be described.

When the power P required for the cooking appliance is determined, the required power P is distributed for each heating unit and the area of the zone Z on which the pattern portion of each heating unit is formed may be determined so as to be proportional to required power P of each pattern portion.

Therefore, the resistance R of each pattern portion may be determined to be inversely proportional to the required power P of each pattern portion by the following [Equation 1].

$$P = \frac{V^2}{R} \qquad \text{[Equation 1]}$$

P is the required power, V is the supply voltage (for example, 220 volts), and R is the resistance of the pattern portion.

On the other hand, each pattern portion is composed of tracks and bridges as described above, and the number of tracks of each pattern portion may be determined. In addition, in a case where there is a connector among each plane heating element, each pattern portion may be considered including a connector.

According to the embodiment, the number N1 of tracks of the first pattern portion may be configured to be equal to or greater than the number N2 of tracks of the second pattern portion, and the number N2 of tracks of the second pattern portion may be configured to be equal to or greater than the number N3 of tracks of the third pattern portion.

As described above, when the area where each heating unit is formed and the number N of tracks of each pattern portion may be determined, the hot wire length L of each pattern portion may be directly measured and may be measured as a length a line connected along a center in the width direction of the tracks and the bridges.

Therefore, the hot wire width W of each pattern portion may be calculated by the following [Equation 2].

$$R = \rho\frac{L}{A} = \rho\frac{L}{W*T} \qquad \text{[Equation 2]}$$

ρ is the resistivity of the material forming the pattern portion, L is a hot wire length of the pattern portion, and A is the hot wire sectional area of the pattern portion and may be defined as a product of the hot wire width W of the pattern portion and the thickness T of the hot wire of the heating unit.

According to the embodiment, the hot wire width W1 of the first pattern portion may be configured as 5 to 20 mm, the hot wire width W2 of the second pattern portion may be configured as 5 to 13.5 mm, and the hot wire width W3 of the third pattern portion may be configured as 8 to 12 mm.

As described above, when the radii R1, R2, and R3 of the zone Z in which each pattern portion is formed, the number N1, N2, and N3 of tracks of each pattern portion, and the hot wire widths W1, W2, and W3 of each pattern portion are designed, the gaps G1, G2, and G3 between the tracks of each pattern portion may be determined by the following [Equation 3], [Equation 4], and [Equation 5].

$$G1 = \frac{R1 - W1*(N1+1)}{N1} \qquad \text{[Equation 3]}$$

$$G3 = \frac{R3 - R2 - W3*(N3+1)}{N3} \qquad \text{[Equation 4]}$$

$$G2 = \frac{R2 - R1 - W2*(N2+1)}{N2} \qquad \text{[Equation 5]}$$

In addition, when the gaps G1, G2, and G3 between the tracks of each pattern portion are determined, the design value may be applied as it is, but the gaps G1, G2, and G3 between the tracks of each pattern portion may be adjusted and also prevent a short circuit.

According to the embodiment, the gaps G1, G2 and G3 between the tracks of each pattern portion may be adjusted so as to be proportional to the heating temperatures Temp1, Temp2 and Temp3 with respect to a position of respective tracks, or the potential differences ΔV1, ΔV2, and ΔV3 with respect to a position of respective tracks.

Figure 8:
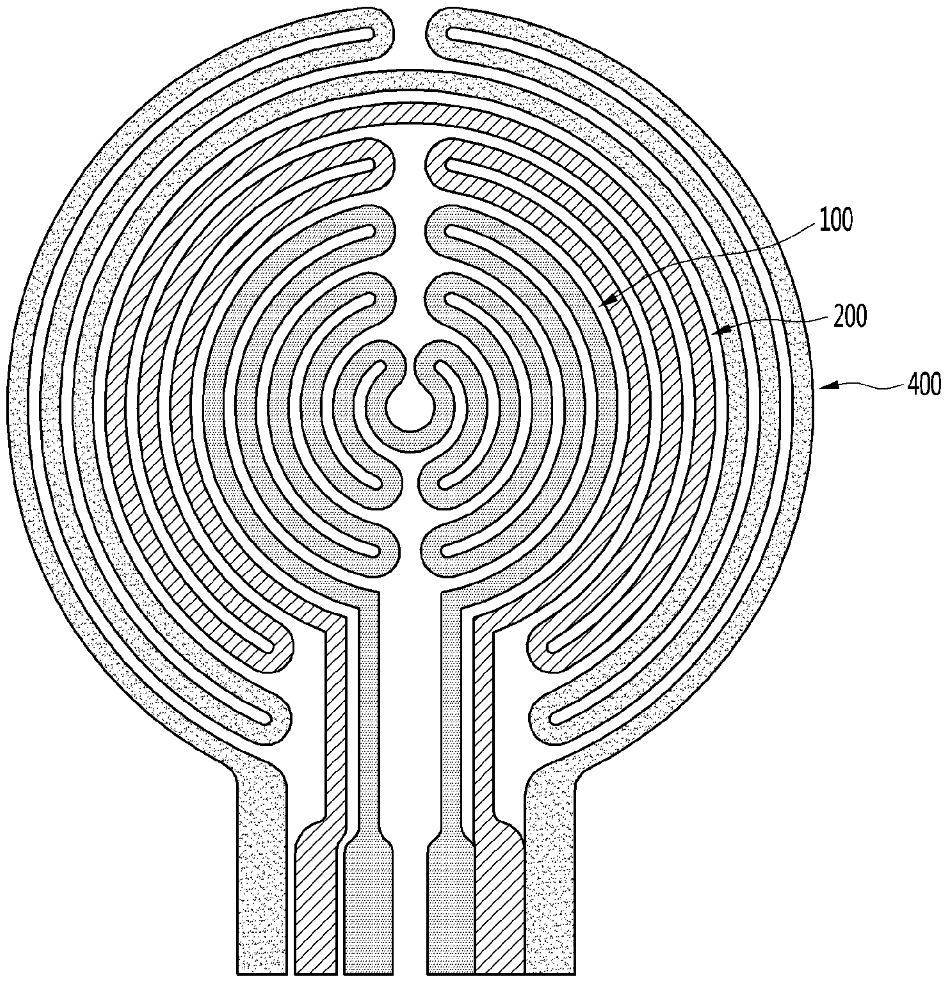
FIG. 8 is a plan view illustrating a triple-type plane heating element according to a second embodiment of the present invention.
Figure 9:
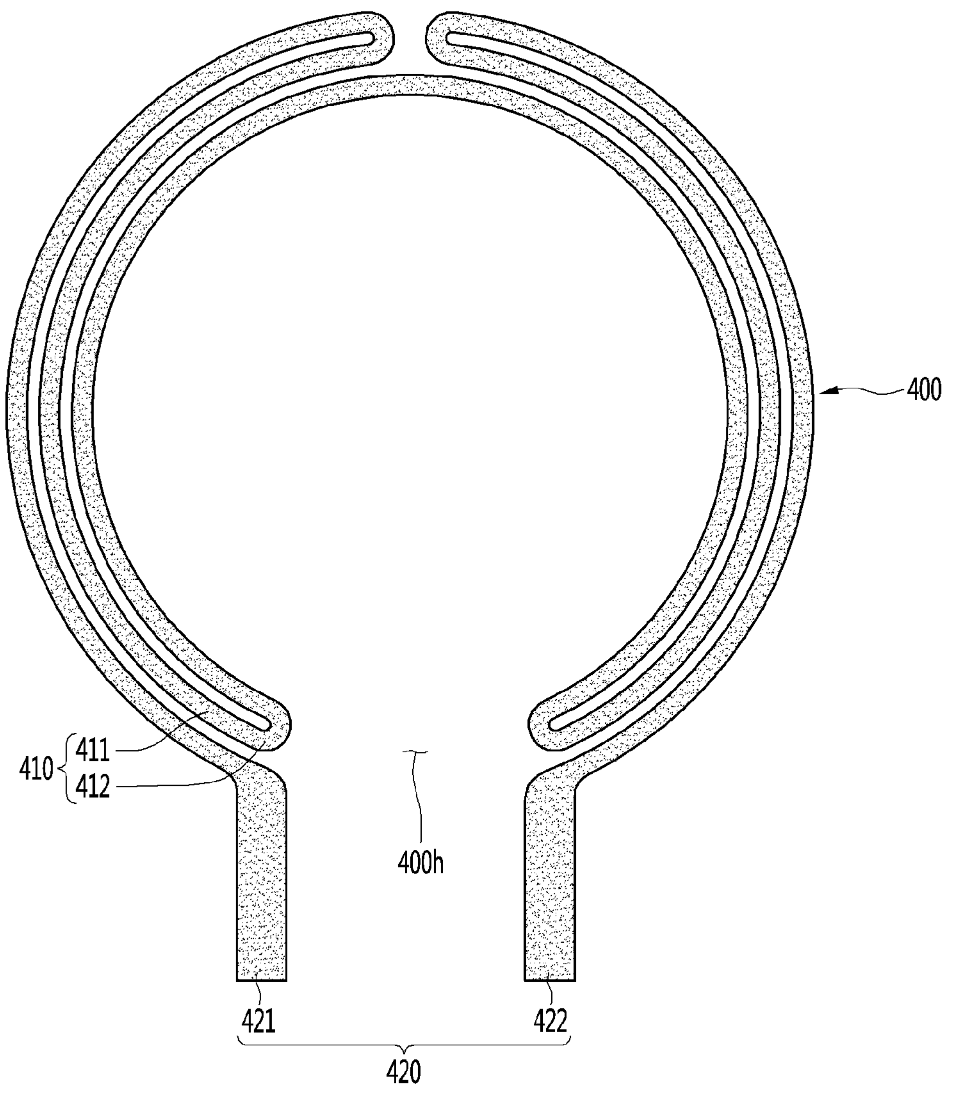
FIG. 9 is a plan view illustrating a third plane heating element of the triple-type plane heating element illustrated in FIG. 8.

FIG. 8 is a plan view illustrating a triple-type plane heating element according to a second embodiment of the present invention, and FIG. 9 is a plan view illustrating a third plane heating element of the triple-type plane heating element illustrated in FIG. 8.

In the first embodiment of the present invention, the electrode portions of the first and second plane heating elements and the electrode portions of the third plane heating element were located in different directions, were provided with two power supplies, and thus more installation space was required inside the cooking appliance.

As illustrated in FIGS. 8 to 9, in order to be more compact than the first embodiment, the triple-type plane heating element according to the second embodiment of the present invention is configured so that the electrode portion of the third plane heating element 400 is located in the same direction as the electrode portion of the first and second plane heating element 100 and 200, and thus only one power supply may be needed.

The first and second plane heating elements 100 and 200 may be configured in the same manner as in the first embodiment, and a detailed description thereof will be omitted.

The third plane heating element 400 is provided outside the second plane heating element 200, and the third plane heating element 400 has a third pattern portion 410 disposed on a third zone Z3 (see FIG. 7) having the limited ring-shaped area, as illustrated in FIG. 8, and a third electrode portion 420 connected to the third pattern portion 410.

The third pattern portion 410 connects the start point and the end point located at the outermost side of the third zone Z3 (illustrated in FIG. 7) with one hot wire.

According to the embodiment, the third pattern portion 410 may include a plurality of third tracks 411 and a plurality of third bridges 412 as in the first embodiment and may be configured in a symmetrical shape in the lateral direction.

The third electrode portion 420 is composed of a third positive electrode 421 and a third negative electrode 422 and has a resistance much lower than that of the third pattern portion 410 so as not to generate heat at a high temperature.

According to the embodiment, the third electrode portion 420 is located in the same direction as the first and second electrode portions 120 and 220 (illustrated in FIGS. 5 and 6), and is connected to one power supply like the first and second electrode portions 120 and 220 (illustrated in FIGS. 5 and 6).

Of course, the third electrode portion 420 including the third positive electrode 421 and the third negative electrode 422 are located on both sides, that is, on the outside with respect to the second electrode portion 220 (illustrated in FIG. 6).

In order to eliminate the potential difference between the second and third electrode portions 220 and 420 (illustrated in FIGS. 6 and 9), the second and third positive electrodes 221 and 421 (illustrated in FIGS. 6 and 9) are disposed adjacent to each other, and the second and third negative electrodes 222 and 422 (illustrated in FIGS. 6 and 9) are located adjacent to each other.

Figure 10:
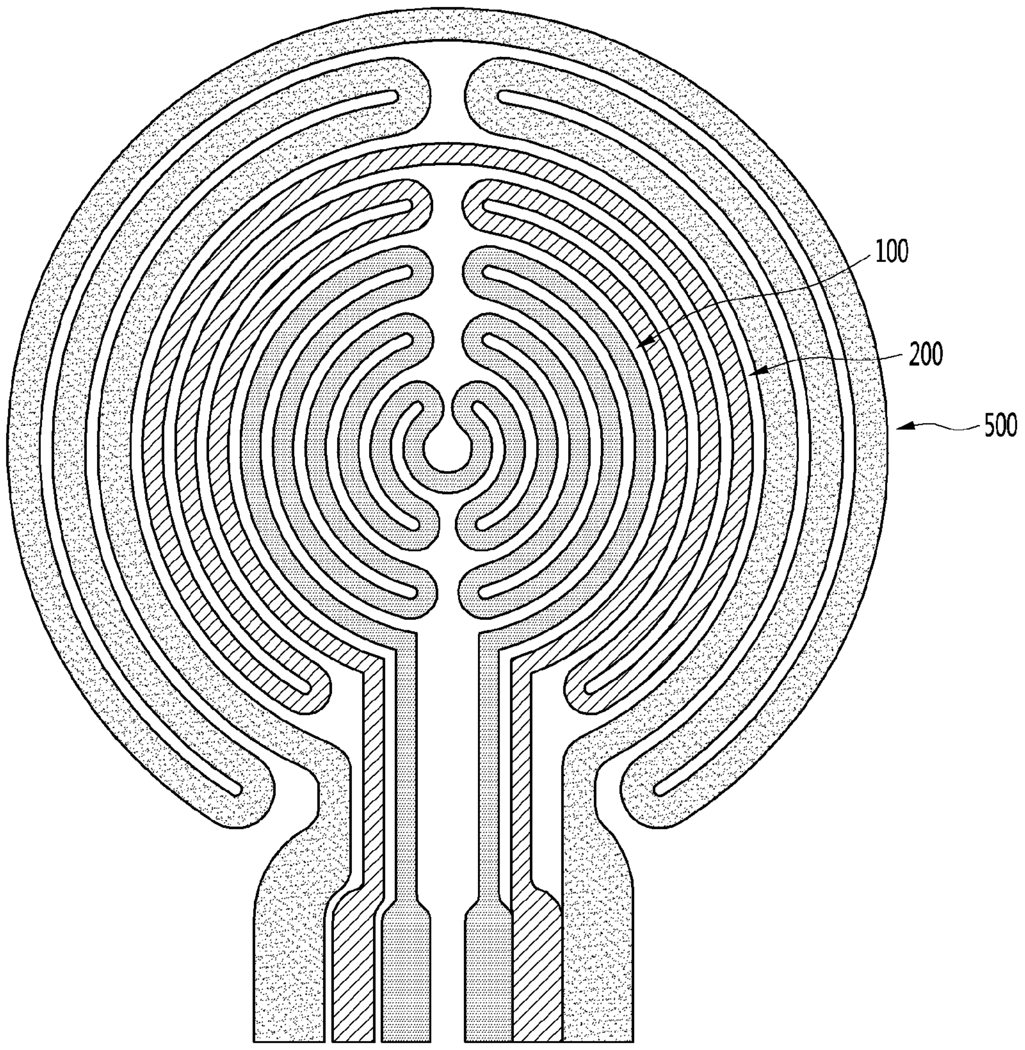
FIG. 10 is a plan view illustrating a triple-type plane heating element according to a third embodiment of the present invention.
Figure 11:
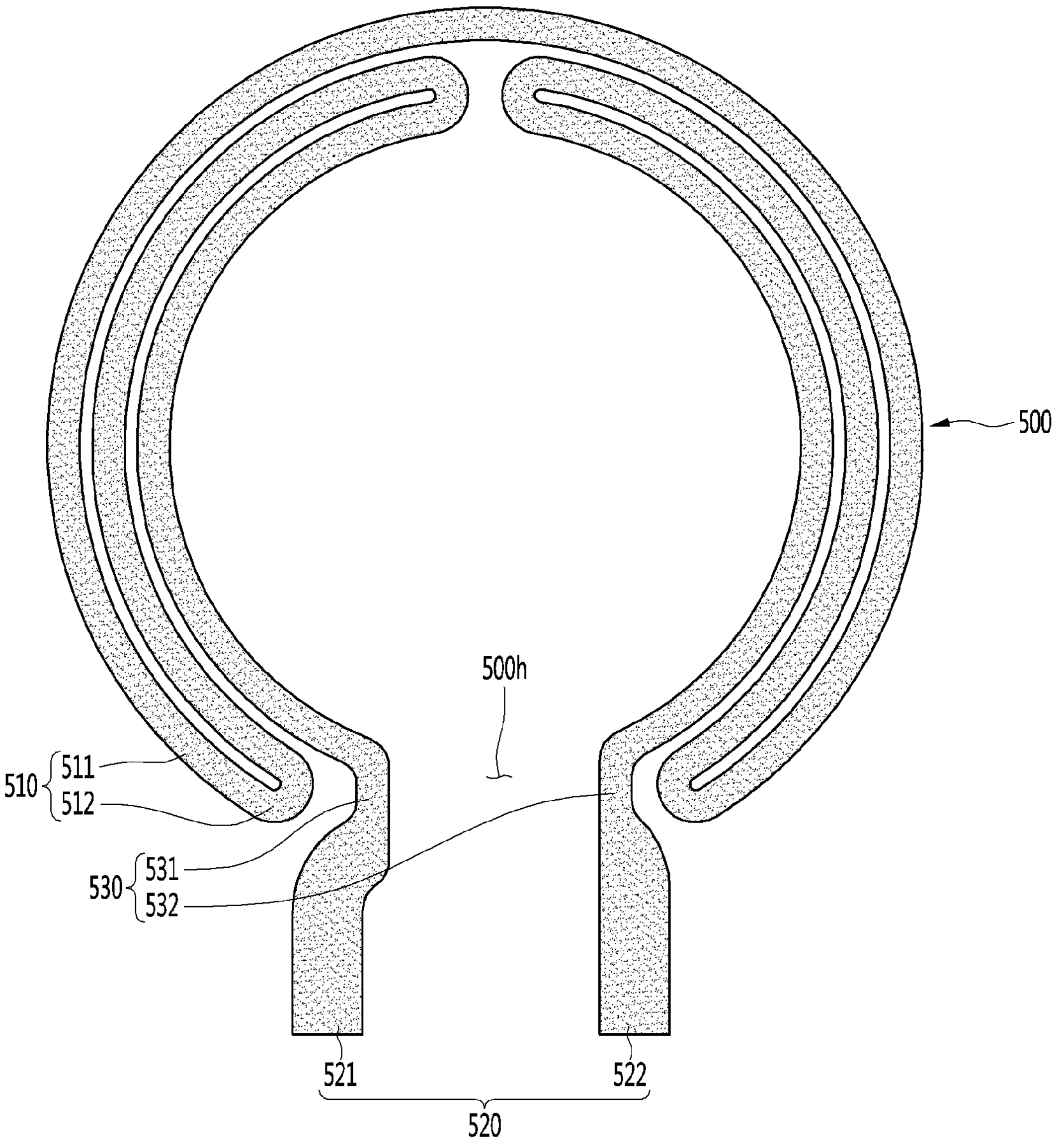
FIG. 11 is a plan view illustrating a third plane heating element of the triple-type plane heating element illustrated in FIG. 10.

FIG. 10 is a plan view illustrating a triple-type plane heating element according to a third embodiment of the present invention, and FIG. 11 is a plan view illustrating a third plane heating element of the triple-type plane heating element illustrated in FIG. 10.

In the second embodiment of the present invention, the start point and the end point of the first pattern portion are located at the outermost side of the first zone, the start point and the end point of the second pattern portion are located at the innermost side of the second zone, but the start point and the end point of the third pattern portion is provided at the outermost side of the third zone.

Therefore, even if the potential difference between the first and second pattern portions does not largely occur since the start point and the end point of the first and second pattern portions is adjacent to each other, the start point and the end point of the second and third pattern portions are located relatively far, and thus a large potential difference may be generated between the second and third pattern portions.

In order to lower the potential difference between the second and third pattern portions in comparison to the second embodiment, the triple-type plane heating element according to the third embodiment of the present invention further includes a third connector 530 in which the start point and the end point of the third pattern portion 510 is located in the innermost side of the third zone Z3 (illustrated in FIG. 7) and connects between the third pattern portion 510 and the third electrode portion 520.

The third pattern portion 510 and the third connector 530 are heating units which generate heat when current flows, whereas the third electrode portion 520 is an unheated unit which does not generate heat even when current flows.

The third pattern portion 510 includes a main heating unit in which the third tracks 511 and the third bridges 512 are connected in series, the start point and the end point of the third pattern portion 510 is located at the innermost side of the third zone Z3 (illustrated in FIG. 7), and may be configured as a symmetrical shape in the lateral direction.

The third electrode portion 520 includes a third positive electrode 521 and a third negative electrode 522, which are located outside the third zone Z3 (illustrated in FIG. 7).

The third connector 530 is formed of an auxiliary heating unit extending from the start point and the end point of the third pattern portion 510, and the third connector 530 includes a third input connector 531 connecting the start point of the third pattern portion 510 and the third positive electrode 521, and the third output connector 532 connecting the end point of the third pattern portion 510 and the third negative electrode 522.

The third connector 530 is configured to generate heat at a high temperature like the third pattern portion 510.

In addition, the third connector 530 is located at an opening portion 500*h* which is outside the first and the second connector 130 and 230 (illustrated in FIGS. 5 and 6) described in the first embodiment, that is, a zone on which the third connector 530 is not formed.

Accordingly, the third connector 530 may uniformly heat the entire third zone Z3 (illustrated in FIG. 7) together with the first and second connectors 130 and 230 (illustrated in FIGS. 5 and 6) and the third pattern portion 510 without a dead zone.

Figure 12:
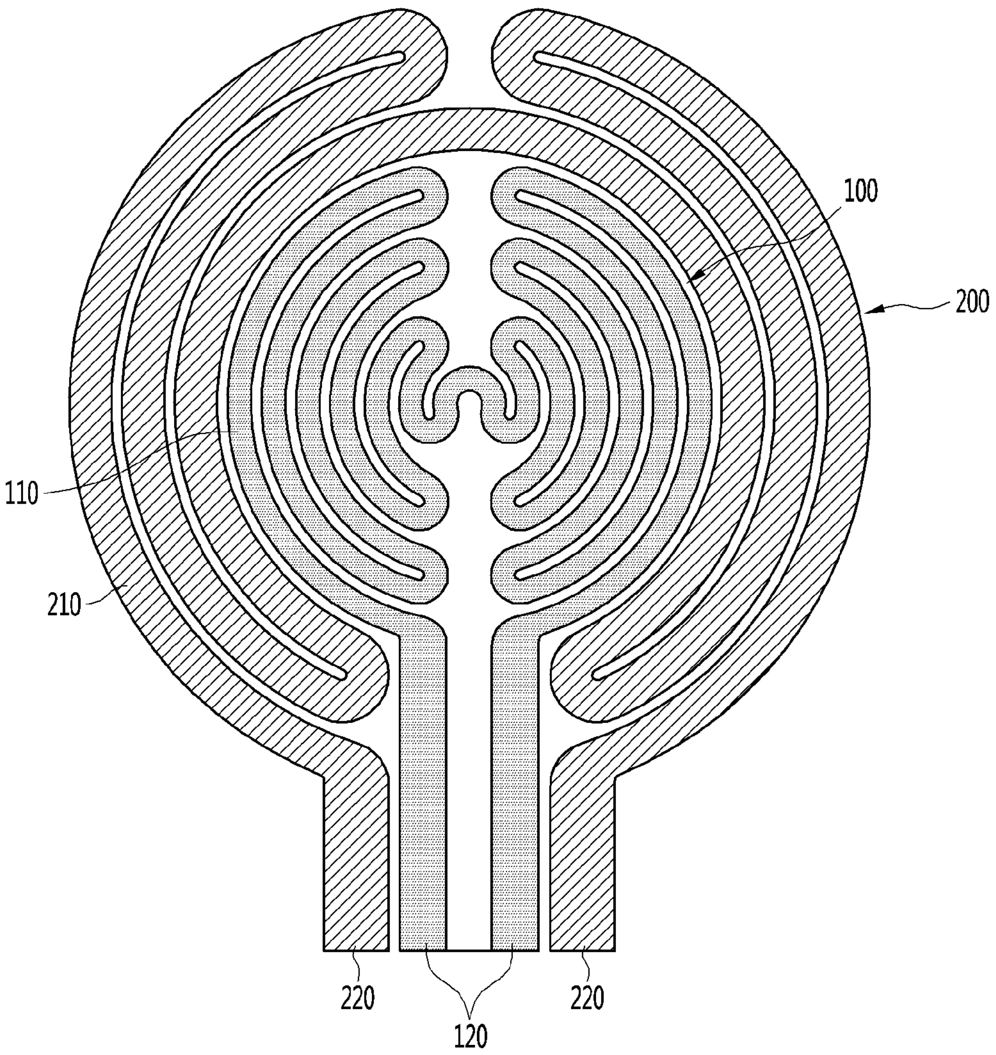
FIG. 12 is a plan view illustrating a dual-type plane heating element according to an embodiment of the present invention.

FIG. 12 is a plan view illustrating a dual-type plane heating element according to an embodiment of the present invention.

As illustrated in FIG. 12, the dual-type plane heating element according to the embodiment of the present invention may be configured with only the first and second plane heating elements 100 and 200, and the first and second plane heating elements 100 and 200 may be formed only with each of the pattern portions 110 and 210 and with each of the electrode portions 120 and 220.

The present disclosure relates to an electric heater having a plurality of plane heating elements, and may be configured in various ways, such as the number and shape of the plane heating elements, and is not limited thereto. For example, more than three plane heating elements may be configured. For example, the plane heating elements may be square or rectangular shaped.

The foregoing description is merely illustrative of the technical idea of the present invention and various changes and modifications may be made by those skilled in the art without departing from the essential characteristics of the present invention.

Therefore, the embodiments disclosed in the present disclosure are intended to illustrate rather than limit the technical idea of the present invention, and the scope of the technical idea of the present invention is not limited by these embodiments.

Various features of the embodiments may be combined or excluded.

The scope of protection of the present invention should be construed according to the following claims, and all technical ideas falling within the equivalent scope to the scope of protection should be construed as falling within the scope of the present invention.

What is claimed is:

1. An electric heater comprising:
a substrate;
a first plane heating element disposed on one surface of the substrate; and
a second plane heating element disposed on the one surface of the substrate so as to be located outside of the first plane heating element,
wherein the first plane heating element includes:
a first pattern portion including a start point and an end point, and disposed on a first zone, the start point and the end point of the first pattern portion disposed at same distance from a center of the first zone, and
a pair of first electrode portions connected to the respective start point and end point of the first pattern portion, the pair of first electrode portions disposed outside the first zone, and
wherein the second plane heating element includes:
a second pattern portion that surrounds a portion of an outer circumference of the first pattern portion, the second pattern portion including a start point and an end point, the start point and the end point of the second pattern portion disposed at same distance from a center of the first zone, and having an opening portion at one side thereof; and
a pair of second electrode portions connected to the respective start portion and end portion of the second pattern portion, the pair of second electrode portions disposed outside the first zone.

2. The electric heater of claim 1,
wherein the start point and the end point of the first pattern portion are located at an outermost side of the first zone, and
the second pattern portion is disposed on a second zone, and the start point and the end point of the second pattern portion are located at an innermost side of the second zone.

3. The electric heater of claim 2,
wherein the first zone having a radius of 99 mm or more, and
the second zone having a radius of 152 mm or more outside the first zone.

4. The electric heater of claim 2,
wherein the second electrode portions are located outside the first electrode portions in the same direction.

5. The electric heater of claim 2, further comprising:
a third plane heating element disposed on the one surface of the substrate so as to be located outside of the second plane heating element,
wherein the third surface heating element further includes:
a third pattern portion that surrounds a portion of an outer circumference of the second pattern portion, the third pattern portion including a start point and an end point, and having an opening portion in the same direction as the opening portion of the second pattern portion, and
a pair of third electrode portions located outside the third pattern portion and connected to the respective start point and end point of the third pattern portion.

6. The electric heater of claim 5,
wherein the third pattern portion is disposed in a third zone, and the start point and the end point of the third pattern portion are located at one of an outermost side of the third zone and an innermost side of the third zone.

7. The electric heater of claim 6,
wherein the third zone having a radius of 225 mm or more outside the second zone.

8. The electric heater of claim 6,
wherein the third electrode portions are located outside the second electrode portions in the same direction.

9. The electric heater of claim 6,
wherein the third electrode portions are located in a different direction to the second electrode portions.

10. The electric heater of claim 5,
wherein at least one pattern portion of the first, the second, and the third pattern portion includes:
a plurality of tracks having an arc shape, which are spaced apart from each other and increase from the inside to the outside in the respective zone, and
a plurality of bridges connecting the tracks in series, and
wherein at least one pattern portion of the first, second, and the third pattern portion is symmetrical about a reference line passing through a center of the first zone.

11. The electric heater of claim 10,
wherein a number N1 of tracks of the first pattern portion is equal to or greater than a number N2 of tracks of the second pattern portion, and
wherein the number N2 of tracks of the second pattern portion is equal to or greater than a number N3 of the third pattern portion.

12. The electric heater of claim 11,
wherein hot wire lengths L1, L2, and L3 of the respective pattern portions are proportional to the numbers N1, N2, and N3 of tracks of the respective plane heating elements and sizes of the zones Z1, Z2, and Z3 on which the respective tracks are formed.

13. The electric heater of claim 12,
wherein hot wire widths W1, W2, and W3 of the respective pattern portions are proportional to the hot wire lengths L1, L2, and L3 of the respective plane heating elements and are inversely proportional to hot wire thicknesses T1, T2, and T3 of the respective pattern portions.

14. The electric heater of claim 13,
wherein the hot wire width W1 of the first track is 5 to 20 mm,
the hot wire width W2 of the second track is 5 to 13.5 mm, and
the hot wire width W3 of the third track is 8 to 12 mm.

15. The electric heater of claim 10,
wherein gaps G1, G2, and G3 between the tracks of the respective pattern portions are proportional to heating temperatures Temp1, Temp2, and Temp3 with respect to a position of each track.

16. The electric heater of claim 10,
wherein gaps G1, G2, and G3 between the tracks of the respective plane heating elements are proportional to potential differences ΔV1, ΔV2, and ΔV3 with respect to a position of each track.

17. A cooking appliance comprising:
a case forming an outer appearance;
a display;
an input unit;
a power supply;

an electric heater provided on the case; and
a controller for controlling the electric heater, the power supply, and the display according to an input from the input unit, wherein
the electric heater includes:
a substrate;
a first plane heating element disposed on one surface of the substrate;
a second plane heating element disposed on the one surface of the substrate so as to be located outside the first plane heating element, and
a third plane heating element disposed on the one surface of the substrate so as to be located outside the second plane heating element,
wherein the first plane heating element includes:
a first heating unit including a start point and an end point, and disposed on a first zone, the start point and the end point of the first heating unit disposed at same distance from a center of the first zone, and
a pair of first electrode portions connected to the respective start point and end point of the first heating unit, the pair of first electrode portions disposed outside the first zone,
wherein the second plane heating element includes:
a second heating unit that surrounds a portion of an outer circumference of the first heating unit, to the second heating unit including a start point and an end point, the start point and the end point of the second heating unit disposed at same distance from a center of the first zone, and having an opening portion at one side thereof; and
a pair of second electrode portions connected to the respective start point and end point of the second heating unit, the pair of second electrode portions disposed outside the first zone; and
wherein the third plane heating element includes:
a third heating unit that surrounds a portion of an outer circumference of the second heating unit, the third heating unit including a start point and an end point, and having an opening portion in the same direction as the direction of the opening portion of the second heating unit; and
a pair of third electrode portions connected to the respective start point and end point of the third heating unit.

18. The cooking appliance of claim 17,
wherein the start point and the end point of the first heating unit are located at an outermost side of the first zone,
the second heating unit is disposed on a second zone, and the start point and the end point of the second heating unit are located at an innermost side of the second zone, and
the third heating unit is disposed in a third zone, and the start point and the end point of the third heating unit are located at one of an outermost side of the third zone and an innermost side of the third zone.

19. The cooking appliance of claim 18,
wherein the second electrode portions are located outside the first electrode portions in the same direction, and
the third electrode portions are located outside the second electrode portions in the same direction.

20. The cooking appliance of claim 18,
wherein the second electrode portions are located outside the first electrode portions in the same direction, and
the third electrode portions are located in a different direction to the second electrode portions.

* * * * *